(12) United States Patent
Lee et al.

(10) Patent No.: US 11,262,805 B2
(45) Date of Patent: Mar. 1, 2022

(54) DISPLAY APPARATUS

(71) Applicant: LG Display Co., Ltd., Seoul (KR)

(72) Inventors: JeongMan Lee, Paju-si (KR); Sunho Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/132,345

(22) Filed: Dec. 23, 2020

(65) Prior Publication Data

US 2021/0200274 A1 Jul. 1, 2021

(30) Foreign Application Priority Data

Dec. 27, 2019 (KR) .......................... 10-2019-0176723

(51) Int. Cl.
*G06F 1/16* (2006.01)
(52) U.S. Cl.
CPC .......... *G06F 1/1656* (2013.01); *G06F 1/1686* (2013.01)
(58) Field of Classification Search
CPC .... G06F 1/1601; G06F 1/1605; G06F 1/1656; G06F 1/1688
See application file for complete search history.

(56) References Cited

U.S. PATENT DOCUMENTS

| | | | |
|---|---|---|---|
| 2006/0120542 A1* | 6/2006 | Lee | H04R 7/045 381/152 |
| 2007/0115619 A1* | 5/2007 | Wang | G06F 1/1605 361/679.23 |
| 2009/0034759 A1* | 2/2009 | Ko | H04N 5/642 381/152 |
| 2016/0050472 A1* | 2/2016 | Lee | H04R 7/045 381/333 |
| 2017/0280234 A1* | 9/2017 | Choi | H04R 7/045 |
| 2019/0018448 A1* | 1/2019 | Lee | G02F 1/136286 |

* cited by examiner

*Primary Examiner* — Anthony Q Edwards
(74) *Attorney, Agent, or Firm* — Morgan, Lewis & Bockius LLP

(57) ABSTRACT

A display apparatus includes a display panel including first, second, and third areas; a first rear cover on a rear surface of the display panel; a second rear cover covering at least a portion of the first rear cover; a first partition between the rear surface of the display panel and the first rear cover to partition the first area, the second area and the third area from one another; a first sound generating module in the first area and the second area to contact the rear surface of the display panel; a second sound generating module in the third area to be spaced apart from the rear surface of the display panel, and a port hole provided in the third area by removing a portion of the first rear cover to allow the second sound generating module to face the rear surface of the display panel.

19 Claims, 11 Drawing Sheets

DISPLAY APPARATUS

CROSS-REFERENCE TO RELATED APPLICATIONS

This application claims the benefit of the Korean Patent Application No. 10-2019-0176723 filed on Dec. 27, 2019, which is hereby incorporated by reference as if fully set forth herein.

BACKGROUND

Technical Field

The present disclosure relates to a display apparatus, and more particularly, to a display apparatus comprising a display panel outputting sound.

Discussion of the Related Art

Generally, a display apparatus is used as a screen built in electronic devices or home appliances, such as a television, a monitor, a notebook computer, a smart phone, a tablet computer, an electronic pad, a wearable device, a watch phone, a portable information device, a navigator and a vehicle control display device, to display images.

A general display apparatus may include a display panel for displaying images, and a sound device for outputting a sound related to an image.

However, a general display apparatus has a problem in that sound quality is deteriorated due to interference between sounds reflected from a wall or the ground as a sound output from a sound device progresses toward a rear direction or a lower direction of a display panel. For this reason, problems occur in that it is difficult to enable exact sound transfer and immersion of a viewer is deteriorated.

SUMMARY

Accordingly, embodiments of the present disclosure are directed to a display apparatus that substantially obviates one or more of the problems due to limitations and disadvantages of the related art.

The inventors of the present disclosure have recognized problems of a general display apparatus and carried out various experiments that may improve sound quality by recognizing a progress direction of a sound toward a front direction of a display panel when a user views images at the front of the display panel. The inventors of the present disclosure have invented a display apparatus of a new structure, which may generate a sound capable of being progressed toward a front direction of the display panel and additionally improve sound quality of a low sound range, through various experiments.

An object of the present disclosure is to provide a display apparatus that enables exact sound transfer.

Another object of the present disclosure is to provide a display apparatus that may improve sound quality and increase a viewer's immersion.

Other object of the present disclosure is to provide a display apparatus that may generate a sound capable of being progressed toward a front direction of a display panel and additionally improve sound quality of a low sound range.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a display panel including a first area, a second area and a third area, a first rear cover disposed on a rear surface of the display panel, a second rear cover covering at least a portion of the first rear cover, a first partition disposed between the rear surface of the display panel and the first rear cover to partition the first area, the second area and the third area from one another, a first sound generating module disposed in the first area and the second area to contact the rear surface of the display panel, a second sound generating module disposed in the third area to be spaced apart from the rear surface of the display panel, and a port hole provided in the third area by removing a portion of the first rear cover to allow the second sound generating module to face the rear surface of the display panel.

According to some embodiments of the present disclosure, an enclosure disposed between the rear surface of the display panel corresponding to the third area and the first rear cover is disposed so as not to overlap the second sound generating module.

According to some embodiments of the present disclosure, the enclosure includes at least two or more first enclosures extended along a first side of the display panel and disposed in parallel with a first direction.

According to some embodiments of the present disclosure, the enclosure includes at least two or more second enclosures extended along a second side of the display panel and disposed in parallel with a second direction.

According to some embodiments of the present disclosure, the first enclosure includes at least six enclosures disposed in an area adjacent to the second sound generating module.

According to some embodiments of the present disclosure, the first enclosure includes an enclosure extension extended in a second direction vertical to the first direction, and the enclosure extension includes at least four extensions.

According to one embodiment of the present disclosure, a display apparatus that enables exact sound transfer may be provided, and a display apparatus that may improve sound quality and increase a viewer's immersion may be provided.

According to one embodiment of the present disclosure, a display apparatus, which may output a sound to a front direction of a display panel and output an amplified sound to a rear direction of the display panel, may be provided.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
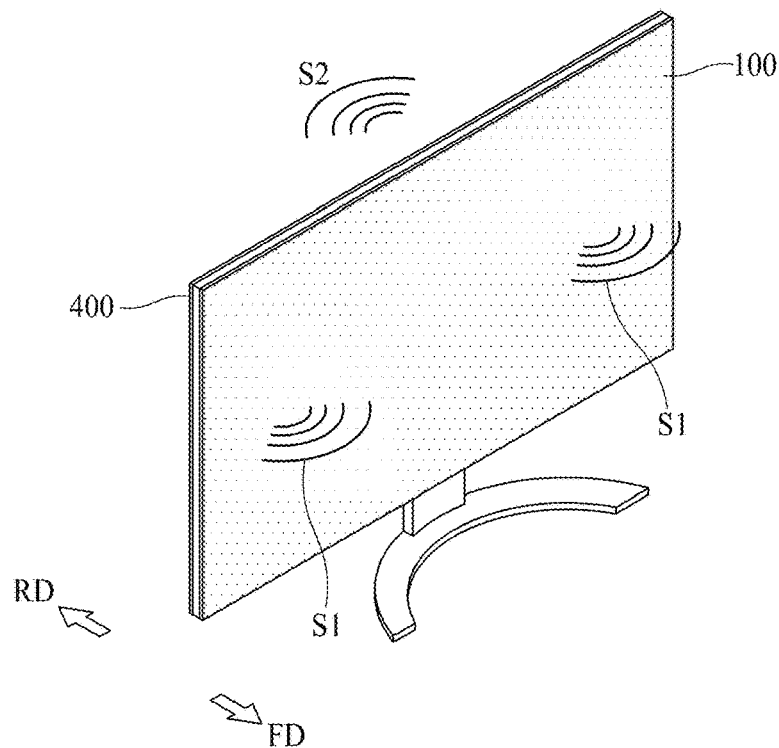
FIG. 1 is a view illustrating a display apparatus according to the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

FIG. 1 is a view illustrating a display apparatus according to the present disclosure.

Referring to FIG. 1, the display apparatus according to the present disclosure may output sounds S1 and S2 in accordance with vibration of a display panel 100 for displaying images.

For example, in the display apparatus, the display panel 100 may be vibrated by a sound generator (or vibration generator) according to one embodiment to generate the sound S1. The sound S1 generated in accordance with vibration of the display panel 100 may directly be output to a front direction FD of a screen of the display apparatus. Also, the display apparatus may output the sound S2 generated by vibration of the sound generator (or vibration generator) to a rear direction RD of the screen of the display panel 100. At this time, the sound S2 output to the rear direction RD of the screen of the display panel 100 may be a sound of a lower sound range than the sound S1 output to the front direction FD of the screen.

The display panel 100 may be all kinds of flat display panels or curved display panels such as a liquid crystal display panel, an organic light emitting display panel, a quantum dot light emitting display panel, a micro light emitting diode display panel, and an electrophoresis display panel. The display panel 100 is not limited to a specific display panel 100 as far as it may be vibrated by a sound generator to generate sound waves or sounds.

The display panel 100 according to one embodiment may include a thin film transistor array substrate that includes a plurality of pixels defined by a plurality of gate lines and a plurality of data lines and a thin film transistor provided in each pixel to drive each pixel, an organic light emitting diode layer provided on the thin film transistor array substrate, and an encapsulation substrate covering the organic light emitting diode layer. The encapsulation substrate protects the thin film transistor and the organic light emitting diode layer from external impact, and prevents water from being permeated into the organic light emitting diode layer.

The display panel 100 according to the present disclosure may include a display area for displaying images, a non-display area surrounding the display area, and a bending area formed to overlap the display area and the non-display area, forming a curved surface at a side of the display panel, and the sound generating module may include a curved surface formed in the display area and the bending area and curved to correspond to the bending area. Therefore, the display apparatus according to another embodiment of the present disclosure may be a bendable display apparatus, and for example, may be, but not limited to, an edge bendable display apparatus.

Figure 2:
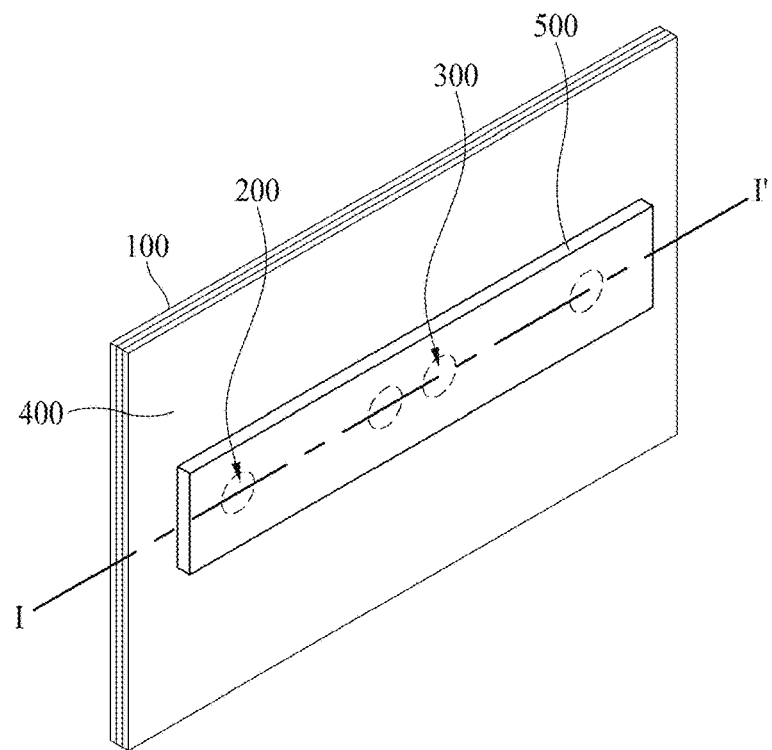
FIG. 2 illustrates a rear surface of a display apparatus shown in FIG. 1

FIG. 2 illustrates a rear surface of a display apparatus shown in FIG. 1. A first sound generating module 200 coupled with a first rear cover 400 and a second sound generating module 300 coupled with a second rear cover 500 is illustrated in FIG. 2.

The first sound generating module 200 and the second sound generating module 300 are arranged at an inner side of the second rear cover 500 and denoted by dotted lines, wherein the first sound generating module 200 is disposed at left and right sides and two second sound generating module 300 are disposed at the center. Although not shown in FIG. 2, a partition may be disposed between the display panel 100 and the first rear cover 400 at a constant interval.

The first rear cover 400 may be provided with a hole formed to correspond to the first sound generating module 200 and the second sound generating module 300, whereby the first sound generating module 200 may be disposed to be directly in contact with a rear surface of the display panel 100, and the second sound generating module 200 may be disposed to be spaced apart from the rear surface of the display panel 100 in a state that it is attached to the second rear cover 500. The first sound generating module 200 may be fixed to the first rear cover 400 to directly vibrate the display panel 100. The first rear cover 400 may fully cover the rear surface of the display panel 100 by interposing a gap space.

The first rear cover 400 according to this embodiment may include at least one material of a glass material, a plastic material and a metal material. As an example, the first rear cover 400 of a glass material may be sapphire glass. As another example, the first rear cover 400 of a metal material may be made of any one of Al, Al alloy, Mg alloy, and alloy of Fe and Ni. As still another example, the first rear cover 400 may has a deposited structure of a glass plate and a metal plate relatively thinner than the glass plate and facing the rear surface of the display panel 100.

In the present disclosure, the first rear cover 400 may be expressed as another term such as housing, cover bottom, back cover, base frame, metal frame, metal chassis, chassis base or m-chassis. Therefore, the first rear cover 400 is a support for supporting the display panel 100, and may be embodied by all kinds of frames surrounding the rear surface of the display apparatus.

As shown in FIG. 2, the second rear cover 500 may accommodate the first sound generating module 200 and the second sound generating module 300, specifically may be disposed to cover the rear surfaces of the first sound generating module 200 and the second sound generating module 300. Also, the second rear cover 500 may be coupled with the first rear cover 400 to rigidly fix the first sound generating module 200 and the second sound generating module 300 to the display apparatus. The second rear cover 500 may be referred to as another term such as a speaker bar.

Figure 3:
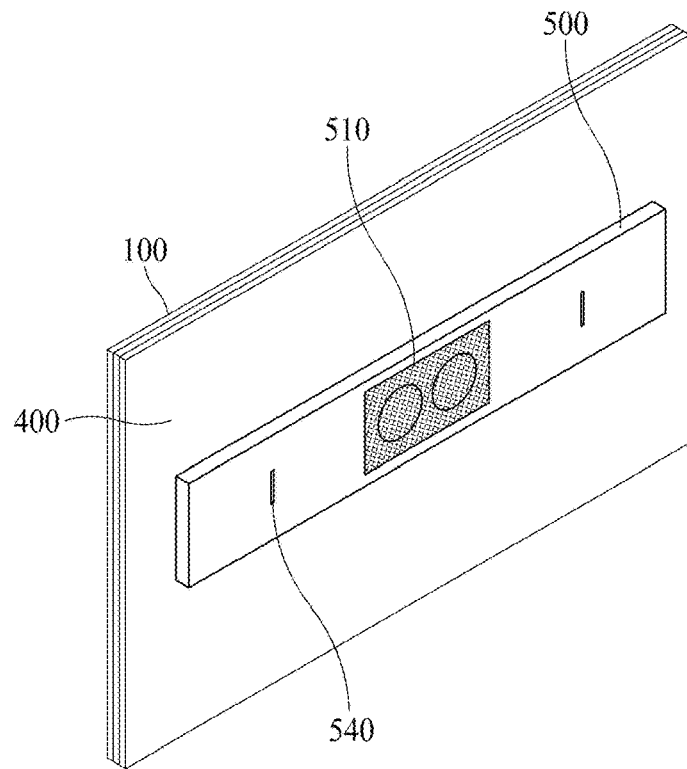
FIG. 3 illustrates a first sound hole and a second sound hole, which are formed in a second rear cover of FIG. 2.

FIG. 3 illustrates a first sound hole 510 and a second sound hole 540, which are formed in the second rear cover 500 of FIG. 2.

The first sound hole 510 may allow a sound of a low sound range, which is generated by the second sound generating module 300, to be emitted to the rear surface of the display apparatus. The second rear cover 500 may include the first sound hole 510 formed to correspond to the second sound generating module 300. The first sound hole 510 is a hole formed to pass through the second rear cover 500, and may provide a path through which a sound generated by the second sound generating module 300 is output. The second sound hole 540 may allow the sound of the low sound range, which is generated by the second sound generating module 300, to be emitted to both sides of the display apparatus, whereby sound quality of the low sound range may be more enhanced. The second sound hole 540 may be, but not limited to, a sound duct.

The first sound hole 510 according to this embodiment may be a fine hole. According to one embodiment, the plurality of the first sound generating module 200 and the second sound generating module 300 may be disposed on the same line. In this case, since sound sources generating sounds may have the same height or similar heights, when a stereo sound expressing a position of a sound through a difference between left and right sounds is reproduced, a localization of a sound image may be improved, in which the sound image is embodied in a right position.

Figure 4:
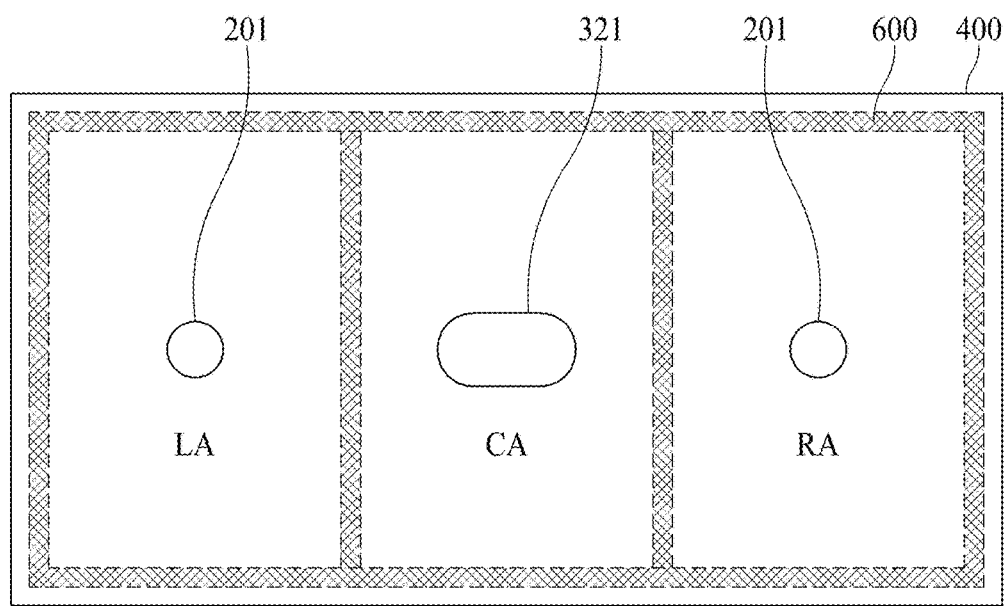
FIG. 4 is a rear plane view illustrating a display apparatus according to one embodiment of the present disclosure.

FIG. 4 is a view illustrating that the display panel 100 and the first rear cover 400 are disposed.

The display apparatus according to the present disclosure may include a display panel 100, a first sound generating module 200, a second sound generating module 300, a first rear cover 400, a partition (or a first partition) 600, a through hole 201, and a port hole 321. A partition 600 for partitioning an area for the first sound generating module 200 from an area for the second sound generating module 300 may be disposed between the display panel 100 and the first rear cover 400, whereby the display panel 100 may be divided into a right area RA, a left area LA and a center area CA.

The partition 600 may be disposed between the display panel 100 and the first rear cover 400, and may surround each of the first sound generating module 200 and the second sound generating module 300 and partition the area where each of the first sound generating module 200 and the second sound generating module 300 is disposed. Also, the partition 600 may define an air gap or space where a sound is generated by the sound generator 200, and may spatially split the sound generated by the first sound generating module 200.

The partition 600 may be made of, but not limited to, polyurethane or polyolefin. Also, the partition 600 may be made of one-sided tape, a double-sided tape, an adhesive or a bond, etc., or may be made of a material having elasticity to be compressed at a certain level. As shown in FIG. 1, the sound S1 may directly be output to the front direction of the screen from the left area LA and the right area RA of the display panel 100, and the sound S2 may be output to the rear direction RD of the screen from the center area CA.

FIG. 4 shows that the through hole 201 is disposed in the left area LA and the right area RA of the first rear cover 400, and the port hole 321 is disposed in the center area CA of the first rear cover 400. The first sound generating module 200 may be disposed to be inserted into the through hole 201 to directly vibrate the rear surface of the display panel 100.

Although not shown in FIG. 4, the second sound generating module 300 attached to the second rear cover 500 may correspond to the port hole 321, whereby a space between the rear surface of the display panel 100 and the first rear cover 400 and a space where the second sound generating module 300 will be vibrated may be provided.

Since the port hole 321 should correspond to the arrangement of the second sound generating module 300 attached to the second rear cover 500, the port hole 321 may have a horizontally long shape. The shape of the port hole 321 should correspond to the arrangement shape of the second sound generating module 300 to provide a space where vibration generated from the second sound generating module 300 may sufficiently be vibrated in the center area CA between the rear surface of the display panel 100 and the second rear cover 500.

If the port hole 321 is formed in a place having no relation with the position of the second sound generating module 300, the space between the rear surface of the display panel 100 and the first rear cover 400, and the space between the first rear cover 400 and the second rear cover 500 may be isolated by the first rear cover 400. This space isolation may not allow the vibration generated from the second sound generating module to be sufficiently vibrated, whereby a sound pressure may be deteriorated.

Figure 5:
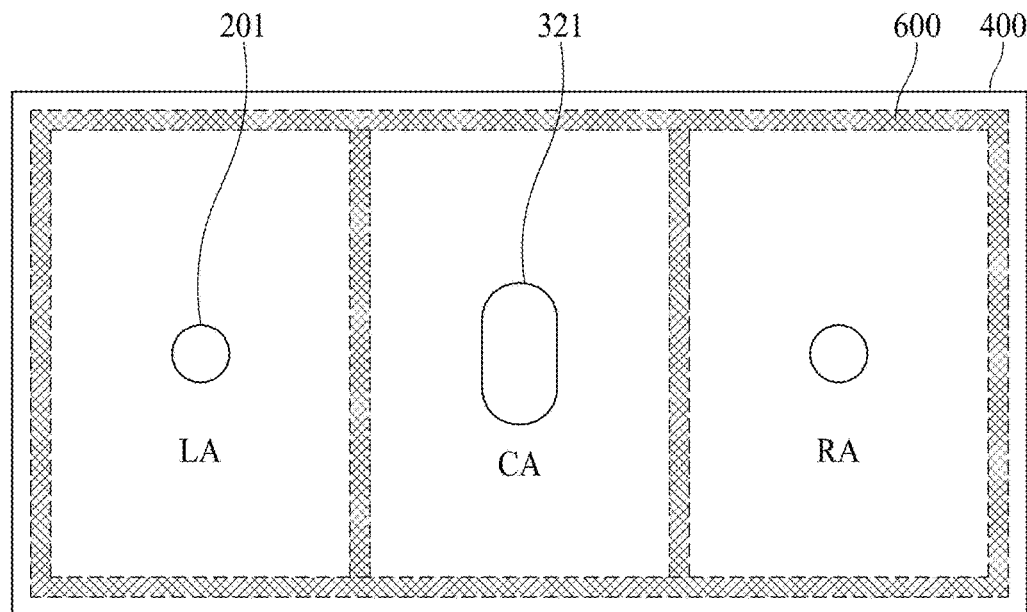
FIG. 5 is a rear plane view illustrating a display apparatus according to another embodiment of the present disclosure.

FIG. 5 is a view illustrating that the display panel 100 and the first rear cover 400 are disposed in accordance with another embodiment.

The display panel 100 shown in FIG. 5 is similar to the rear structure of the display panel 100 described in FIG. 4 but may be considered that arrangement of the second sound generating module 300 is modified. In the embodiment of FIG. 5, the second sound generating module 300 may be disposed vertically not horizontally. This arrangement of the second sound generating module 300 may generate a relatively lower sound range than of the first sound generating module 200 to provide a difference to a sound pressure of the low sound range. If the second sound generating module 300 is disposed vertically, a vertically long space of the center area CA on the rear surface of the display panel 100 may be used more efficiently, whereby better sound may be output.

Figure 6:
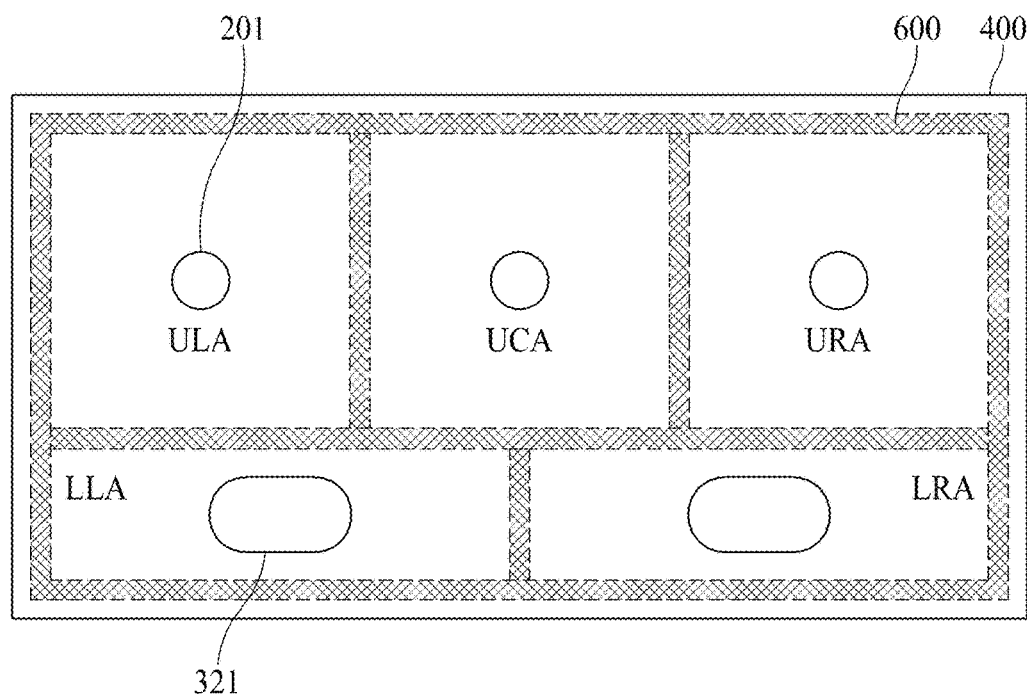
FIG. 6 is a rear plane view illustrating a display apparatus according to other embodiment of the present disclosure.

FIG. 6 is a view illustrating that the display panel 100 and the first rear cover 400 are disposed in accordance with still another embodiment.

In FIG. 6, the sound generating module may be disposed in more various arrangements than those of FIGS. 4 and 5, whereby the rear area of the display panel 100 may be divided into an upper portion and a lower portion. The upper portion may be partitioned into an upper right area URA, an upper left area ULA, and an upper center area UCA, and the lower portion may be partitioned into a lower right area LRA and a lower left area LLA, whereby a total of five areas may be partitioned. These areas may be partitioned by the partition 600 disposed between the display panel 100 and the first rear cover 400. The through hole 201 corresponding to the first sound generating module 200 may be disposed in each of the upper right area URA, the upper left area ULA and the upper center area UCA, and the port hole 321 corresponding to the second sound generating module 300 may be disposed in the lower right area LRA and the lower left area LLA.

Figure 7:
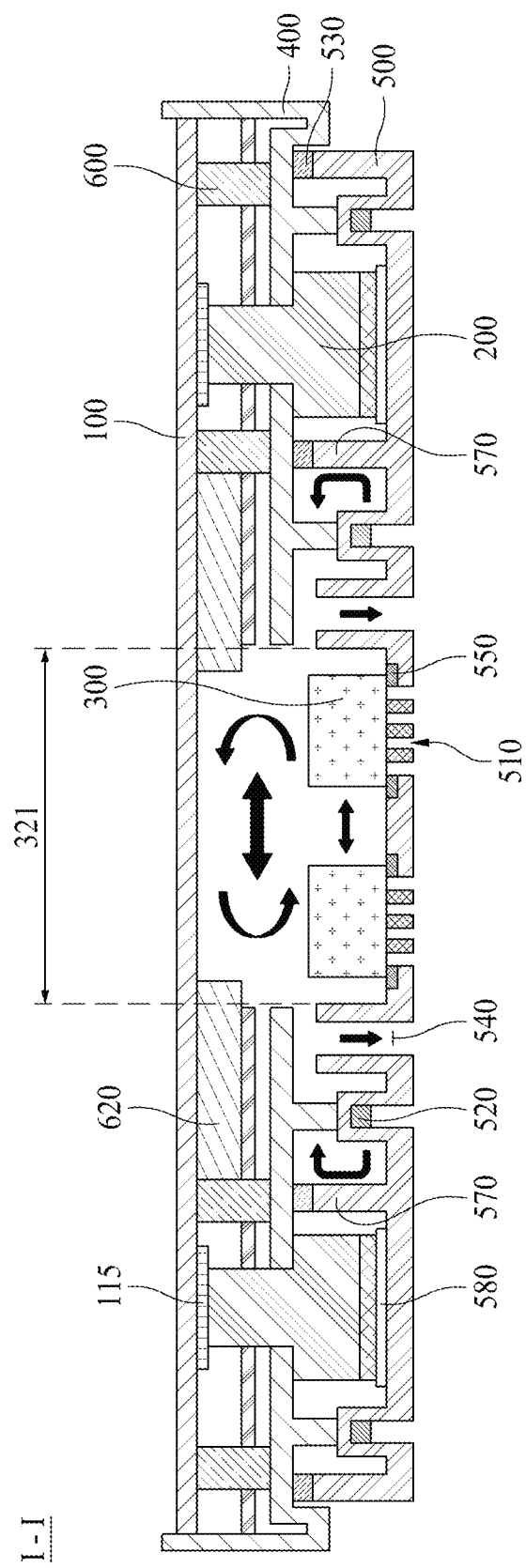
FIG. 7 is a cross-sectional view taken along line I-I' shown in FIG. 2.

FIG. 7 is a cross-sectional view taken along line I-I' shown in FIG. 2.

The display panel 100, the first rear cover 400, the second rear cover 500, the partition 600, the first sound generating module 200 and the second sound generating module 300 are shown in a cross-sectional structure. The partition 600 is formed between the display panel 100 and the first rear cover 400 to spatially partition the first sound generating module 200 from the second sound generating module 300. The through hole 201 is formed in the first rear cover 400 such that the first sound generating module 200 is inserted into the through hole 201, and the display panel 100 and the first sound generating module 200 may be disposed to be in contact with each other. An aluminum pad 115 may be added between the display panel 100 and the first sound generating module 200. The aluminum pad 115 may allow the first sound generating module 200 to be well in contact with the display panel 100, and may well emit heat generated due to vibration of the first sound generating module 200. Also, the port hole 321 may be formed in the first rear cover 400 to allow the space between the rear surface of the display panel 100 and the first rear cover 400 to be communicated with the space between the first rear cover 400 and the second rear cover 500.

The space between the display panel 100 and the second sound generating module 300 may be defined as a resonance space (RS), and may be defined as a space where a sound is amplified by the second sound generating module 300. An enclosure 620 may be disposed in the center area CA among the spaces partitioned by the partition 600. The enclosure 620 may have a pattern for well dispersing the sound generated from the second sound generating module 300 to the center area CA. The partition 600 may have a closed structure to partition the areas, whereas the enclosure 620 may be disposed to have an open structure to disperse the sound.

The first rear cover 400 may be expressed as another term such as housing, cover bottom, back cover, base frame, metal frame, metal chassis, chassis base or m-chassis. Therefore, the first rear cover 400 is a support for supporting the display panel 100, and may be embodied by all kinds of frames surrounding the rear surface of the display apparatus.

The second rear cover 500 may accommodate the first sound generating module 200 and the second sound generating module 300, specifically may be disposed to cover the rear surfaces of the first sound generating module 200 and the second sound generating module 300. Also, the second rear cover 500 may include a first sound hole 510 formed correspond to the second sound generating module 300. The first sound hole 510 is a hole formed to pass through the second rear cover 500, and may provide a path through which the sound generated by the second sound generating module 300 is output. The second sound hole 540 may allow the sound of the low sound range, which is generated by the second sound generating module 300, to be emitted to both sides of the display apparatus, whereby sound quality of the low sound range may be more enhanced. A heat diffusion pad 580 may be disposed between the second rear cover 500 and the first sound generating module 200. Heat generated from the first sound generating module 200 may be well emitted due to the heat diffusion pad 580.

Also, the second rear cover 500 may be coupled with the first rear cover 400 to rigidly fix the first sound generating module 200 and the second sound generating module 300 to the display apparatus. The second rear cover 500 may be referred to as another term such as a speaker bar. A fixing member 520 may be disposed in the second rear cover 500 to couple the first area cover 400 with the second rear cover 500. Also, an adhesive layer 530 for preventing the sound generated from the first sound generating module 200 or the second sound generating module 300 from leaking out may be disposed in the portion where the first rear cover 400 is in contact with the second rear cover 500.

A barrier wall 570 (or a second partition) where the second rear cover 500 is partially extended toward the first rear cover 400 may be disposed in the second rear cover 500 to isolate the space between the first sound generating module 200 and the second sound generating module 300. The sound of the first sound generating module 200 and the sound of the second sound generating module 300 may respectively be output through the barrier wall without being mixed with each other.

The second sound generating module 300 may be spaced apart from the display panel 100 and then attached to the second rear cover 500. At this time, a vibration absorption member 550 may be disposed between the second sound generating module 300 and the second rear cover 500, whereby the second rear cover 500 may not be vibrated directly due to the second sound generating module 300. For example, the vibration absorption member 550 may be, but not limited to, a vibration absorption tape. If the second rear cover 500 is directly vibrated by vibration of the second sound generating module 300, unintended various sounds may be generated depending on the material of the second rear cover 500 to cause interference in the output of the sound.

The second sound generating module 300 may generate a sound of a low sound range, wherein the low sound range may be, but not limited to, 500 Hz or less. Also, a vibration wave generated from the first sound generating module 200 may directly be vibrated by the display panel 100, whereby sounds of middle and high sound ranges may be output to the front surface of the display apparatus. The first sound generating module 200 may generate the sounds of the middle and high sound ranges, wherein the middle sound range may be, but not limited to, 200 Hz to 3 kHz, and the high sound range may be, but not limited to, 3 kHz or more.

Figure 8:
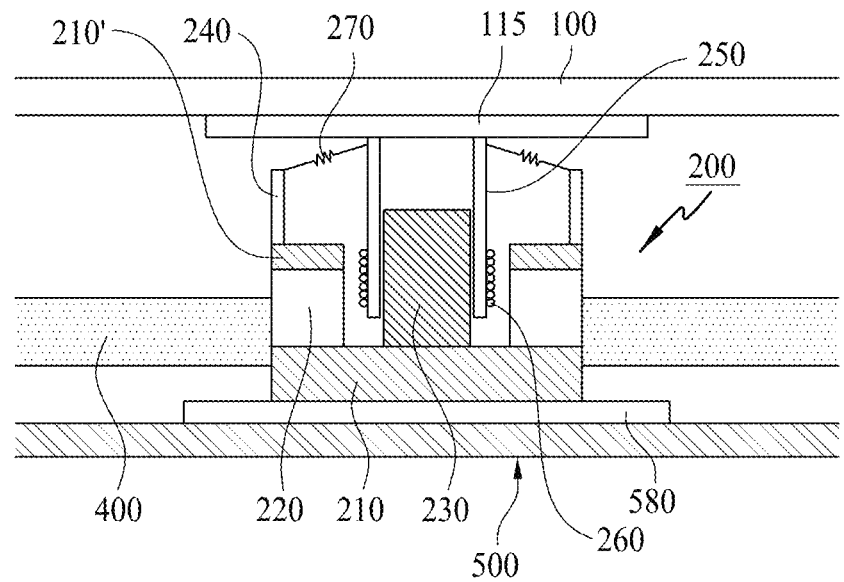
FIGS. 8 and 9 are cross-sectional views illustrating a first sound generating module and a display apparatus according to one embodiment of the present disclosure.
Figure 9:
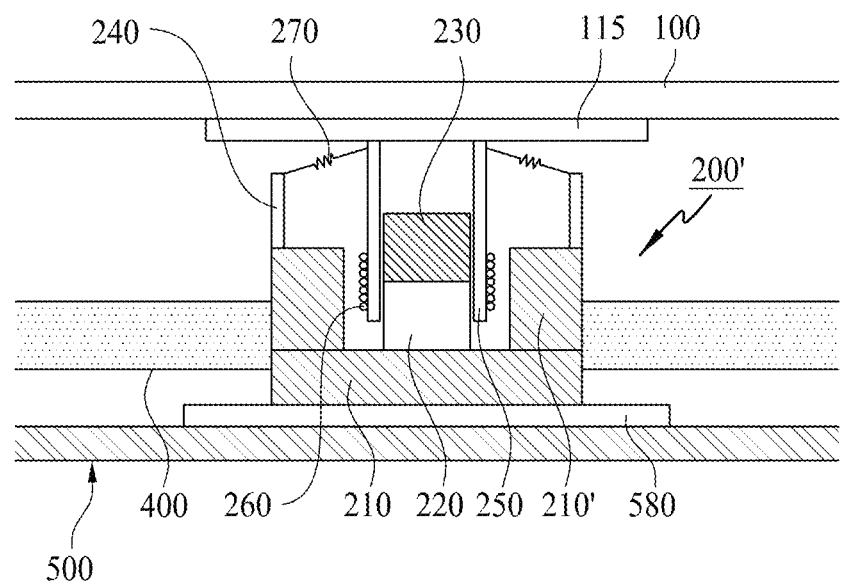

FIGS. 8 and 9 illustrate the first sound generating module according to one embodiment of the present disclosure.

The first sound generating module 200 may be categorized into a first structure in which a magnet is disposed outside a coil, and a second structure in which a magnet is disposed inside a coil. The first structure may be expressed as a dynamic type or an external magnetic type. The second structure may be expressed as a micro type or an internal magnetic type.

FIG. 8 illustrates the first structure of the first sound generating module, and FIG. 9 illustrates the second structure of the first sound generating module.

Referring to FIG. 8, the sound generating module 200 may include plates 210 and 210', a magnet 220 on the plates, a center pole 230 on the plates, a bobbin 250 disposed around the center pole 230, and a coil 260 wound outside the bobbin 250.

For example, the magnet 220 is provided on the first plate 210, and the second plate 210' is provided on the magnet 220. The first plate 210 and the second plate 210' may fix the sound generating module 200 to the support member 300 while supporting the magnet 220. Therefore, the first plate 210 may be fixed to a support hole formed in the support member 300, and the magnet 220 arranged between the first plate 210 and the second plate 210' may fixedly be supported.

At least one of the first plate 210 and the second plate 210' may be made of a material having magnetism such as Fe. The plate may be expressed as another term such as yoke.

A sintering magnet such as barium ferrite may be used as the magnet 220. The magnet 220 may be made of, but not limited to, an alloy cast magnet of $Fe_2O_3$, $BaCO_3$, Nd magnet, strontium ferrite having an improved magnetic component, Al, Ni, and Co. The Nd magnet may be Nd—Fe—B, for example.

A frame 240 is disposed on the second plate 210' while existing outside the first plate 210. A center pole 230 is disposed on a center area of the first plate 210. The center pole 230 and the first plate 210 may be formed in a single body. The center pole 230 may be referred to as pole pieces. Alternatively, pole pieces may further be disposed on the center pole 230.

The bobbin 250 surrounding the center pole 230 is disposed. The coil 260 is wound around a lower portion of the bobbin 250, and a current for sound generation is applied to the coil 260.

The bobbin 250 may be a ring shaped structure formed of paper or Al sheet, and the coil 260 may be wound around a certain area below the bobbin 250. The bobbin 250 and the coil 260 may be expressed as a voice coil.

A damper 270 may be disposed between a portion above the bobbin 250 and the frame 240. The damper may be expressed as another term such as edge.

The first sound generating module 200 may directly be in contact with the rear surface of the display panel 100 to output a sound, and may be inserted into the through hole 201 of the first rear cover 400. The aluminum pad 115 may be added between the display panel 100 and the first sound generating module 200. The aluminum pad 115 may allow the first sound generating module 200 to be well in contact with the display panel 100, and may well emit heat generated due to vibration of the first sound generating module 200. When the first sound generating module 200 is vibrated to output the sound through the through hole 201, the aluminum pad 115 may rigidly be coupled to the first rear cover 400. Also, when the first sound generating module 200 is vibrated to output the sound as the rear surface of the first sound generating module 200 is covered by the second rear cover 500, the aluminum pad may prevent the first sound generating module 200 from being detached from the display panel 100. A heat diffusion pad 580 may be disposed between the second rear cover 500 and the first sound generating module 200. Heat generated from the first sound generating module 200 may be well emitted due to the heat diffusion pad 580.

FIG. 9 illustrates a second structure in which a magnet is arranged inside a coil.

Referring to FIG. 9, the first sound generating module 200' of the second structure may include the magnet 220 on the first plate 210, the center pole 230 on the magnet 220, the bobbin 250 disposed around the magnet 220 and the center pole 230, and the coil 260 wound around the bobbin 250.

For example, the first plate 210 may be fixed to the support hole formed in the support member 300. The magnet 220 is disposed on the first plate 210, and the center pole 230 is disposed on the magnet 220. The center pole 230 may be referred to as pole pieces. Alternatively, the pole pieces may further be disposed on the center pole 230.

The bobbin 250 is disposed to surround the magnet 220 and the center pole 230, and the coil 260 is wound outside the bobbin 250.

The second plate 210' is disposed near the outside of the first plate 210, and the frame 240 is disposed outside the second plate 210'. The damper 270 is disposed between the frame 240 and the bobbin.

The first sound generating module 200' of the second structure has advantages in that leakage flux is smaller than that of the first structure in which the magnet is disposed outside the coil, and an overall size may be more reduced than that of the first structure.

The first sound generating module 200 may directly be in contact with the rear surface of the display panel 100 to output a sound, and may be inserted into the through hole 201 of the first rear cover 400. The aluminum pad 115 may be added between the display panel 100 and the first sound generating module 200. The aluminum pad 115 may allow the first sound generating module 200 to be well in contact with the display panel 100, and may well emit heat generated due to vibration of the first sound generating module 200. When the first sound generating module 200 is vibrated to output the sound through the through hole 201, the aluminum pad 115 may rigidly be coupled to the first rear cover 400. Also, when the first sound generating module 200 is vibrated to output the sound as the rear surface of the first sound generating module 200 is covered by the second rear cover 500, the aluminum pad may prevent the first sound generating module 200 from being detached from the display panel 100. A heat diffusion pad 580 may be disposed between the second rear cover 500 and the first sound generating module 200. Heat generated from the first sound generating module 200 may be well emitted due to the heat diffusion pad 580.

The sound generating module used in the display apparatus according to the embodiment of the present disclosure is not limited to the structures shown in FIGS. 8 and 9, and another type sound generator that may generate a sound by vibrating the display panel may be used.

Although not shown in FIGS. 8 and 9, the first sound generating module 200 may further include a fastening structure, such as nut, pem nut, screw, and screw through hole, for being coupled to the first rear cover 400.

FIGS. 10 to 14 illustrate an arrangement example of an enclosure 650 in a center area CA of a display panel 100 according to various embodiments of the present disclosure.

Figure 10:
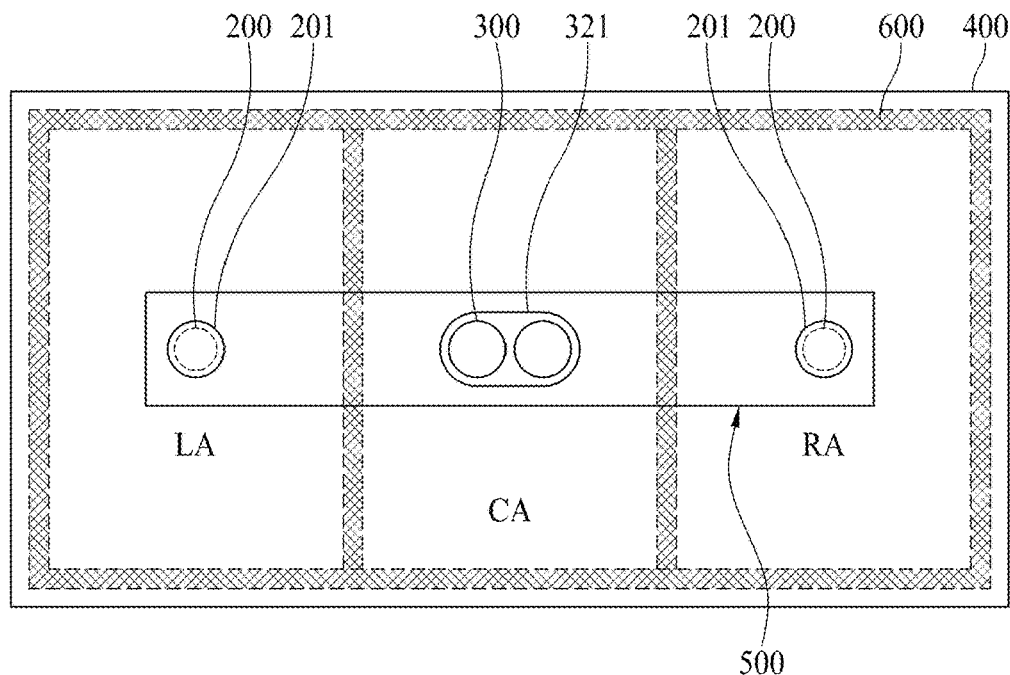
FIGS. 10 to 14 are plane views illustrating a rear enclosure of a display apparatus according to one embodiment of the present disclosure.

FIG. 10 illustrates an embodiment to which the second sound generating module 300 and the port hole 320 are only applied. The partition 600 disposed between the display panel 100 and the first rear cover 400 may be disposed to surround each of the first sound generating module 200 and the second sound generating module 300 such that the first sound generating module 200 and the second sound generating module 300 may be spaced apart from each other. A sound may be output using a resonant space of the center area CA without the enclosure 650.

Since a process of attaching the enclosure 650 in manufacture of the display apparatus may be omitted, productivity may be better than the other embodiment. The entire center area CA on the rear surface of the display panel 100 may be used as the resonant space, whereby the vibration wave output from the second sound generating module 300 may be resonated and then emitted to the rear surface of the display apparatus through the first sound hole 510 and the second sound hole 540 of the second rear cover 500.

The second sound generating module 300 may be disposed in parallel with a direction of a long side of the display panel 100 but is not limited thereto. The second sound generating module 300 may be disposed in a vertical direction or other various directions. The first sound generating module 200 may be disposed in the left area LA and the right area RA to be directly in contact with the rear surface of the display panel 100.

Figure 11:
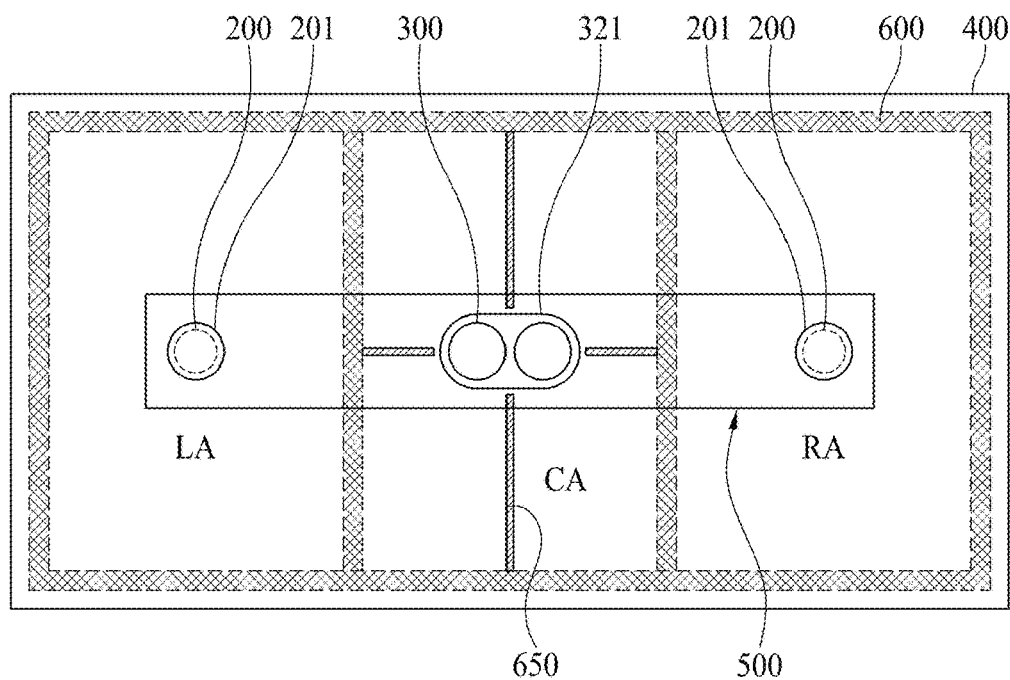

FIG. 11 illustrates an embodiment in which the enclosure 650 is disposed in the center area CA on the rear surface of the display panel 100. The partition 600 disposed between the display panel 100 and the first rear cover 400 may be disposed to surround each of the first sound generating module 200 and the second sound generating module 300 such that the first sound generating module 200 and the second sound generating module 300 may be spaced apart from each other.

The enclosure 650 may have a shape extended from the center of the second sound generating module 300 to left and right directions and up and down directions. The extended enclosure 650 may be extended to the partition 600 of the center area CA, and the center area CA may be split into four resonant spaces due to the arrangement of the enclosure 650. Sound impedance of the resonant spaces of FIG. 11 may relatively be more enhanced at a specific low frequency period than that of the resonant space of FIG. 10 due to the arrangement of the enclosure 650. The vibration wave generated from the second sound generating module 300 may vibrate the resonant spaces and then output to the rear surface of the display apparatus through the first sound hole 510 and the second sound hole 540 of the second rear cover 500.

The second sound generating module 300 may be disposed in parallel with a direction of a long side of the display panel 100 but is not limited thereto. The second sound generating module 300 may be disposed in a vertical direction or other various directions. The first sound generating module 200 may be disposed in the left area LA and the right area RA to be directly in contact with the rear surface of the display panel 100.

Figure 12:
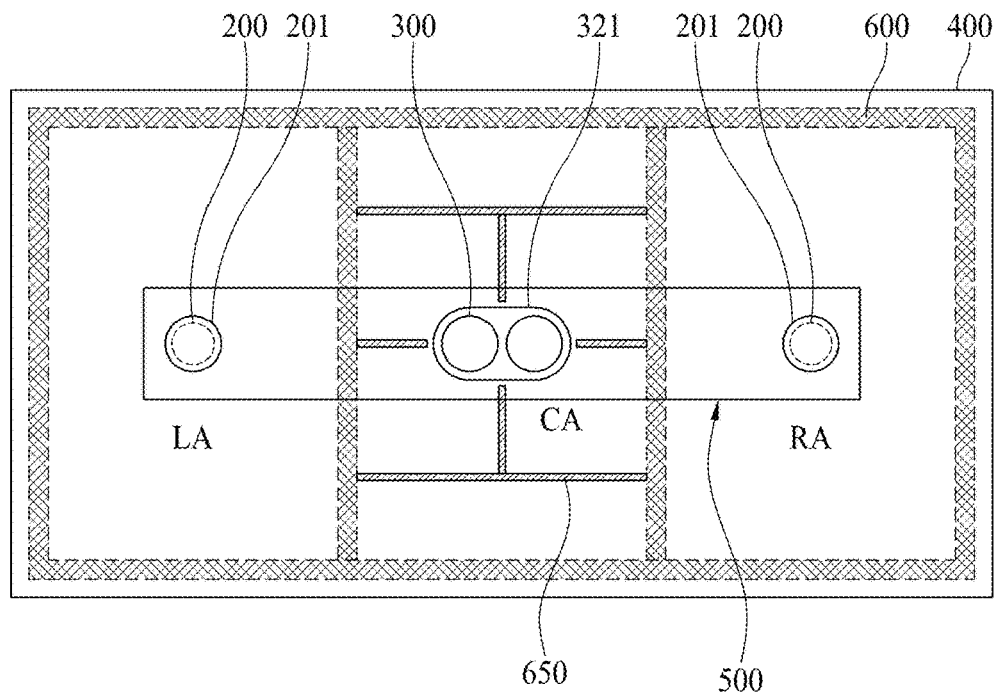

FIG. 12 illustrates another embodiment in which the enclosure 650 is disposed in the center area CA on the rear surface of the display panel 100. The partition 600 disposed between the display panel 100 and the first rear cover 400 may be disposed to surround each of the first sound generating module 200 and the second sound generating module 300 such that the first sound generating module 200 and the second sound generating module 300 may be spaced apart from each other. In addition to the enclosure 650 extended from the center of the second sound generating module 300 to the left and right directions and the up and down directions, the enclosure 650 parallel with the long side of the display panel 100 may additionally be provided.

The arrangement of the enclosure 650 may split the center area CA adjacent to the second sound generating module 300 into four areas, and up and down outer portions of the center area CA may be spaced apart from the second sound generating module 300. For example, the enclosure 650 parallel with the long side of the display panel 100 may be disposed in a place spaced apart from the partitions 600 in the upper and lower direction of the center area CA at a certain distance. Four enclosures 650 extended from the center of the second sound generating module 300 in up and down directions and left and right directions may be disposed, whereby the enclosures 650 extended in the left and right directions may reach their adjacent partition 600, and the enclosures 650 extended in the up and down directions may reach the enclosure 650 disposed in parallel with the long side of the display panel 100.

Sound impedance of the resonant space in FIG. 12 may be prevented from being vibrated at a specific frequency period due to the arrangement of the enclosures 650 in comparison with the resonant space in FIG. 11. The vibration wave generated from the second sound generating module 300 may vibrate the resonant space and then output to the rear surface of the display apparatus through the first sound hole 510 and the second sound hole 540 of the second rear cover 500. The second sound generating module 300 may be disposed in parallel with a direction of the long side of the display panel 100 but is not limited thereto. The second sound generating module 300 may be disposed in a vertical direction or other various directions. The first sound generating module 200 may be disposed in the left area LA and the right area RA to be directly in contact with the rear surface of the display panel 100.

Figure 13:
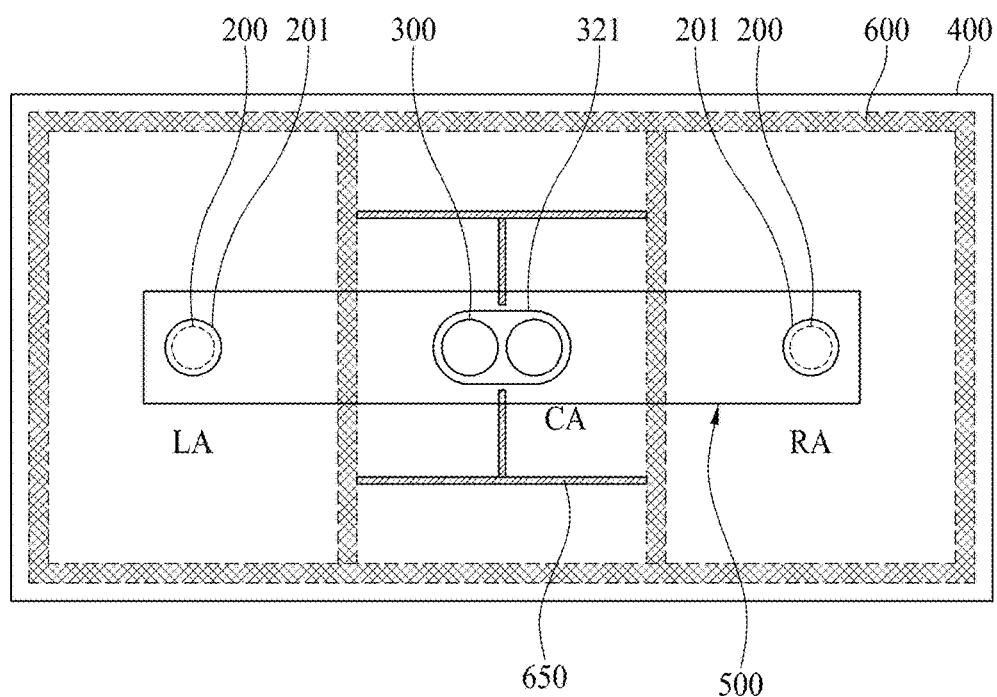

FIG. 13 illustrates still another embodiment in which the enclosure 650 is disposed in the center area CA on the rear surface of the display panel 100. The partition 600 disposed between the display panel 100 and the first rear cover 400 may be disposed to surround each of the first sound generating module 200 and the second sound generating module 300 such that the first sound generating module 200 and the second sound generating module 300 may be spaced apart from each other. In addition to the enclosure 650 extended from the center of the second sound generating module 300 to the up and down directions, the enclosure 650 parallel with the long side of the display panel 100 may additionally be provided.

The arrangement of the enclosure 650 may split the center area CA adjacent to the second sound generating module 300 into two areas, and up and down outer portions of the center area CA may be spaced apart from the second sound generating module 300. For example, the enclosure 650 parallel with the long side of the display panel 100 may be disposed in a place spaced apart from the partitions 600 in the up and down direction of the center area CA at a certain distance. Two enclosures 650 extended from the center of the second sound generating module 300 in up and down directions may be disposed, whereby the extended enclosures 650 may reach the enclosure 650 disposed in parallel with the long side of the display panel 100.

A unit resonant space in FIG. 13 may be more widened through two-split arrangement of the center area CA than that provided through four-split arrangement of the center area CA near the second sound generating module 300 of FIG. 12. It is noted from the arrangement of the enclosure 650 that sound impedance of the resonant space in FIG. 13 is higher at a specific frequency period than that of the resonant space in FIG. 12.

The vibration wave generated from the second sound generating module 300 may vibrate the resonant space and then output to the rear surface of the display apparatus through the first sound hole 510 and the second sound hole 540 of the second rear cover 500. The second sound generating module 300 may be disposed in parallel with a direction of the long side of the display panel 100 but is not limited thereto. The second sound generating module 300 may be disposed in a vertical direction or other various directions. The first sound generating module 200 may be disposed in the left area LA and the right area RA to be directly in contact with the rear surface of the display panel 100.

Figure 14:
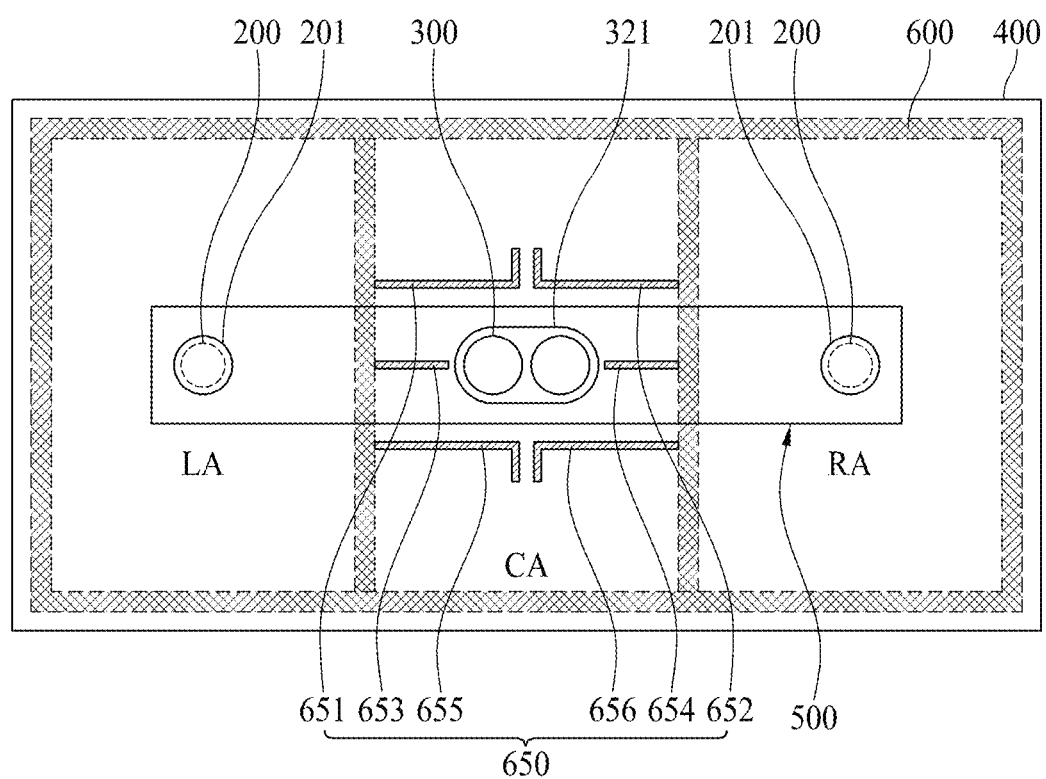

FIG. 14 illustrates further still another embodiment in which the enclosure 650 is disposed in the center area CA on the rear surface of the display panel 100. The partition 600 disposed between the display panel 100 and the first rear cover 400 may be disposed to surround each of the first sound generating module 200 and the second sound generating module 300 such that the first sound generating module 200 and the second sound generating module 300 may be spaced apart from each other. The enclosure 650 may include third and fourth enclosures 653 and 654 extended from the center of the second sound generating module 300 to the left and right directions of the second sound generating module 300. The enclosure 650 may further include a first enclosure 651, a second enclosure 652, a fifth enclosure 655 and a sixth enclosure 656, which are disposed to be spaced apart from the third enclosure 653 and the fourth enclosure 654 at a certain distance. For example, the first enclosure 651, the second enclosure 652, the fifth enclosure 655 and the sixth enclosure 656 may partially be parallel with the long side of the display panel 100, and may partially be extended from the center to the up and down directions of the second sound generating module 300. The upper and lower areas of the center area CA may be connected with the resonant area of the second sound generating module 300 by a path of the enclosure 650, which has a predetermined width.

The enclosure 650 having such a path may have sound impedance having no singularity through reaction with the upper and lower areas of the center area CA when the resonant space is vibrated by the vibration wave generated from the second sound generating module 300. For example, the enclosure 650 may have uniform sound impedance even in case of low frequency due to a relatively narrow resonant space in comparison with FIG. 10, and the sound may uniformly be emitted due to the path generated in the up and down directions of the enclosure 650 such that an excessive sound pressure may not be isolated in the resonant space even in case of high frequency.

In this way, the sound generated from the second sound generating module 300 may be output to the rear surface of the display apparatus through the first sound hole 510 and the second sound hole 540 of the second rear cover 500. The second sound generating module 300 may be disposed in parallel with a direction of the long side of the display panel 100 but is not limited thereto. The second sound generating module 300 may be disposed in a vertical direction or other various directions. The first sound generating module 200 may be disposed in the left area LA and the right area RA to be directly in contact with the rear surface of the display panel 100.

Figure 15:
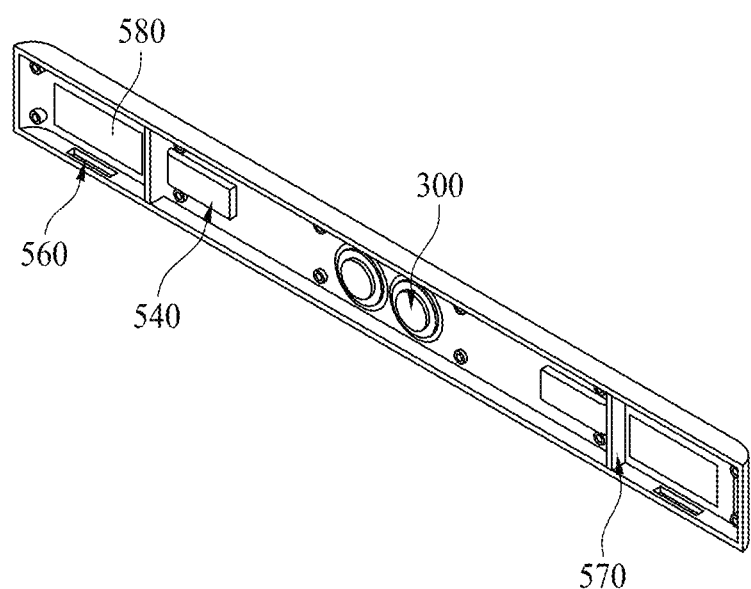
FIG. 15 is a view illustrating a rear cover according to one embodiment of the present disclosure.
Figure 16:
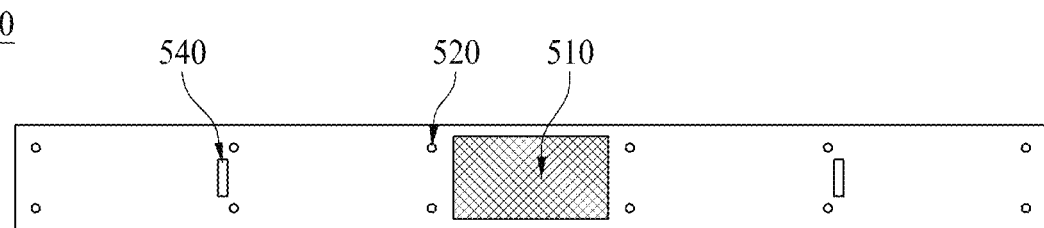
FIG. 16 is a view illustrating an upper surface and a side of a rear cover according to one embodiment of the present disclosure.
Figure 16:
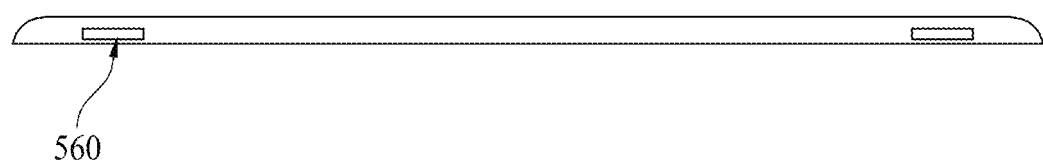

FIG. 15 is a detailed view illustrating a structure of the second rear cover 500, and FIG. 16 is a view illustrating an upper surface and a side of the second rear cover 500. The outer structure of the second rear cover 500 is simply shown in FIG. 3 while the inner side of the second rear cover 500 is shown in FIG. 15 in detail.

As described above, the second rear cover 500 may be attached to the first rear cover 400 on the rear surface of the display panel 100 in a single body with the second sound generating module 300 directly attached thereto. The second sound hole 540 may be disposed at left and right sides near the second sound generating module 300 such that the sound generated from the second sound generating module 300 may be output to the side of the second rear cover 500. The second rear cover 500 may have a plurality of fixing members 520 to be attached to the first rear cover 400. The barrier wall 570 extended from a portion of the second rear cover 500 to the first rear cover 400 may be disposed to space the space where the first sound generating module 200 is disposed apart from the resonant space of the second generating module 300. The barrier wall 570 extends form the second rear cover 500 to correspond to the partition 600 to from areas corresponding the right area RA, the left area LA and the center area CA between the first rear cover 400 and the second rear cover 500.

The first sound generating module 200 may directly transfer vibration to the display panel 100 to output the sound. Vibration of the first sound generating module 200 may generate heat. The generated heat may be trapped in the first rear cover 400 and the second rear cover 500. This may cause a temperature increase in a specific portion of the display panel 100. Since the temperature increase in the specific portion of the display panel 100 may cause distortion of a screen provided by the display panel 100, control of heat may be an important issue in the sound generating module.

A ventilation hole 560 may be disposed in a side space of the second rear cover 500 to control heat generated from the first sound generating module 200, which is trapped in the first rear cover 400 and the second rear cover 500. The ventilation hole 560 may be a radiation duct, but is not limited thereto. For example, a hole may be disposed at the side of the second rear cover 500 to correspond to the upper and lower position where the first sound generating module 200 is disposed, whereby heat generated from the first sound generating module 200 may be emitted to the outside of the second rear cover 500. Also, a heat diffusion pad 580 may be disposed in the space where the first sound generating module 200 is disposed, whereby heat generated from the first sound generating module 200 may be emitted to the outside.

Figure 17:
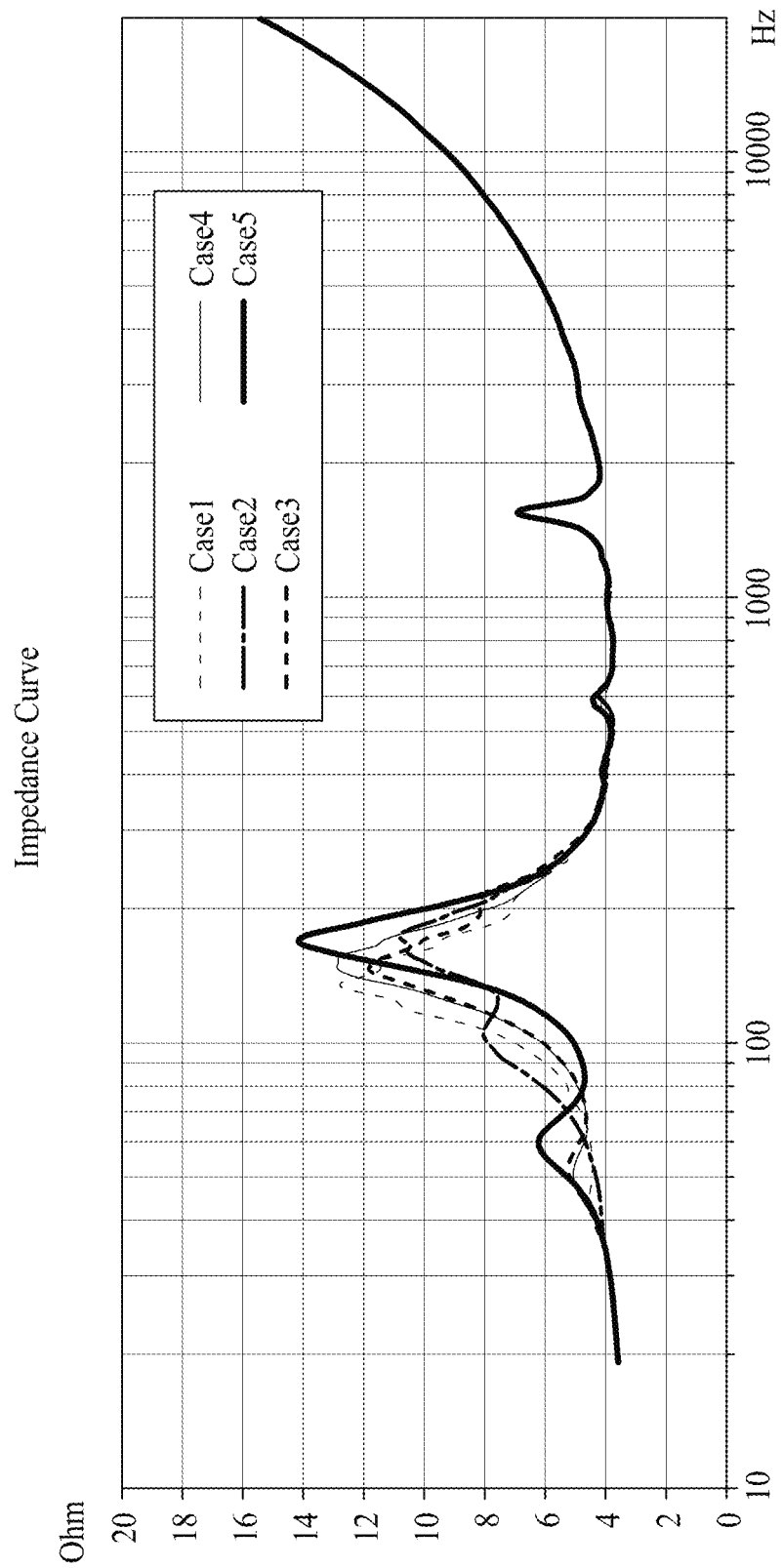
FIG. 17 is a graph illustrating frequency-impedance characteristics of a second sound generating module according to various embodiments of the present disclosure.

FIG. 17 is a graph illustrating frequency-impedance characteristics of a second sound generating module according to various embodiments of the present disclosure. FIG. 17 is an impedance graph per frequency measured by the second sound generating module 300 when the center area CA is embodied in various shapes in accordance with application of the embodiments of FIGS. 10 to 14. The embodiments of FIGS. 10, 11, 12, 13 and 14 may respectively be set to case 1, case 2, case 3, case 4 and case 5, whereby impedance values for five cases may be compared with one another at the same time. Impedance may be a force for disturbing a current flowing in an alternating current circuit, and this may be resistance in a direct current circuit.

Since the case 1 is a structure having no enclosure 650, the center area CA may fully be used as the resonant space by the sound generated from the second sound generating module 300. Among the cases, in the case 1, the sound is generated using the widest resonant space. It is noted from the case 1 that there are many periods where impedance is varied. This may be considered that standing waves are more generated than resonance of progress waves in spite of a wide resonant space.

In the case 2, the enclosure 650 in the center area CA is extended to up and down directions and left and right directions of the second sound generating module 30 to reach the partition. This four-split of the center area CA may control the sound generated from the second sound generating module 300 in accordance with a certain direction and space, whereby the standing waves may be reduced.

In the case 3, the enclosure 650 parallel with the long side of the display panel 100 may be added to a portion spaced apart from the partitions 600 in the upper and lower direction of the center area CA. Four-split resonant spaces of a narrow area may be provided to control offset of progress waves and reflective waves, which may occur in a wide resonant space.

In the case 4, the four-split resonant spaces of the center area CA of the case 3 may be enlarged to two-split resonant spaces to improve impedance.

In the case 5, the enclosure 650 in a vertical direction is removed from the four-split resonant structure of the case 3. A duct structure for connecting the upper and lower spaces of the center area CA, which are sealed from the second sound generating module 300, is formed to allow the sound to partially interact with the upper and lower spaces of the center area CA.

This arrangement of the enclosure 650 may embody impedance of a slow curve where standing waves are not generated. For example, it is noted from that impedance of a slow curve is embodied from 85 Hz to 350 Hz to output sound more excellent than those of the other cases. This impedance may be measured by a mutual relationship between the sound generating module and the resonant space. If impedance is embodied in a slow curve, it may be considered that the sound is well tuned.

The enclosure 650 may control a direction of the progress wave and a direction of the reflective wave by reflecting the sound wave generated from the second generating module 300, and moreover may allow the standing wave not to be generated. Therefore, the enclosure 650 cannot be disposed to overlap the second sound generating module 300 and may be disposed to be spaced apart from the second sound generating module 300 to disperse the sound.

Figure 18:
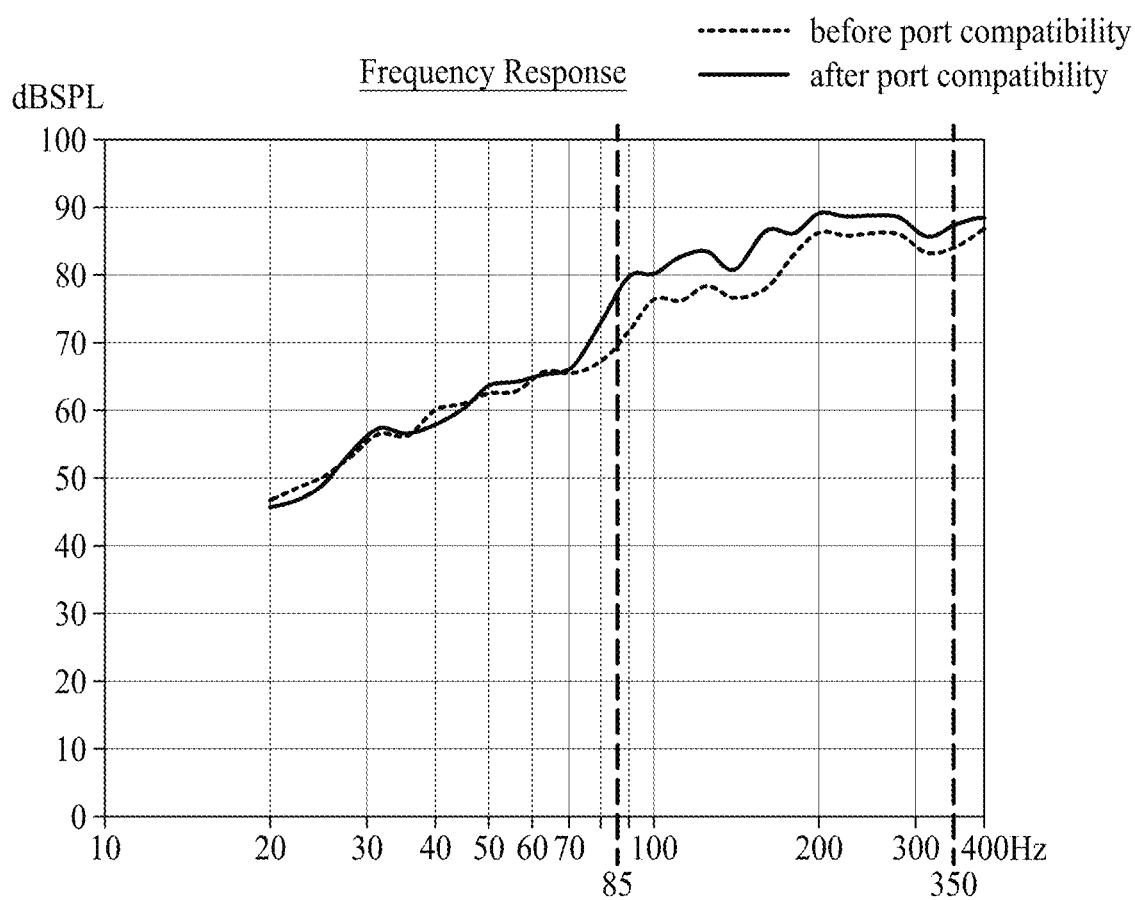
FIG. 18 is a graph illustrating frequency-sound pressure characteristics before and after a port hole according to one embodiment of the present disclosure is used.

FIG. 18 is a sound-pressure graph illustrating a result of an experiment performed to check the effect of the port hole 321 in the embodiments.

If the port hole 321 is not applied, the resonant space of the second sound generating module 300 may be restricted between the first rear cover 400 and the second rear cover 500 to restrict resonance of the sound wave. On the other hand, if the space between the rear surface of the display panel 110 and the second rear cover 500 is fully used through the port hole 321, the sound wave may be controlled using the enclosure 650 to suppress occurrence of the standing wave and generate resonance, whereby the sound may be more amplified.

Referring to the graph, it is noted that the sound pressure is generally high in the experiment to which the port hole 321 is applied. For example, referring to the frequency area between 85 Hz and 350 Hz, it is noted that the sound pressure is higher when the resonant space is enlarged using the port hole 321.

The display apparatus according to the present disclosure comprises a display panel including a first area, a second area and a third area, a first rear cover disposed on a rear surface of the display panel, a second rear cover covering at least a portion of the first rear cover, a first partition disposed between the rear surface of the display panel and the first rear cover to partition the first area, the second area and the third area from one another, a first sound generating module disposed in the first area and the second area to contact the rear surface of the display panel, a second sound generating module disposed in the third area to be spaced apart from the rear surface of the display panel, and a first sound hole provided in the third area by removing a portion of the first rear cover to allow the second sound generating module to face the rear surface of the display panel.

According to some embodiments of the present disclosure, the display apparatus further comprises an enclosure disposed between the rear surface of the display panel and the first rear cover and disposed in the third area so as not to overlap the second sound generating module.

According to some embodiments of the present disclosure, the first sound generating module may generate a sound in the first and second areas by directly vibrating the rear surface of the display panel, and the second sound generating module may generate a sound in the third area by vibrating a resonant space formed through the first sound hole between the rear surface of the display panel and the second sound generating module.

According to some embodiments of the present disclosure, the display apparatus may further comprise a second partition extending from the second rear cover to correspond to the first partition to form areas corresponding to the first area, the second area, and the third area between the first rear cover and the second rear cover, and the second rear cover may include a first sound hole and a second sound hole.

According to some embodiments of the present disclosure, the enclosure may include at least two or more first enclosures extended along a first side of the display panel and disposed in parallel with a first direction.

According to some embodiments of the present disclosure, the enclosure may include at least two or more second enclosures extended along a second side of the display panel and disposed in parallel with a second direction.

According to some embodiments of the present disclosure, the first enclosure may include at least six enclosures disposed in an area adjacent to the second sound generating module.

According to some embodiments of the present disclosure, the first enclosure may include an enclosure extension extended in a second direction vertical to the first direction, and the enclosure extension may include at least four extensions.

According to some embodiments of the present disclosure, the first area and the second area are a left area and a right area of the display panel, respectively, and the third area is a center area of the display panel, which is not overlapped with the first area and the second area.

The display apparatus according to the present disclosure comprises a display panel including a first area, a second area and a third area, a first rear cover disposed on a rear surface of the display panel, a second rear cover covering at least a portion of the first rear cover, a first sound generating module disposed between the display panel and the second rear cover and disposed in the first area and the second area, a second sound generating module disposed between the display panel and the second rear cover and disposed in the third area, a first partition partitioning the first area, the second area and the third area from one another between the display panel and the first rear cover, a first sound hole provided in an area where the first rear cover and the second sound generating module are overlapped with each other by removing a portion of the first rear cover, and a second sound hole provided in an area where the second rear cover and the second sound generating module are overlapped with each other by removing at least a portion of the second rear cover.

According to some embodiments of the present disclosure, the display apparatus further comprises a second partition disposed between the first rear cover and the second rear cover and extended from the second rear cover to partition the first area, the second area and the third area from one another, and a third sound hole provided in the second rear cover.

According to some embodiments of the present disclosure, the display apparatus further comprises an enclosure disposed between the rear surface of the display panel corresponding to the third area and the first rear cover, wherein the enclosure is disposed so as not to overlap the second sound generating module.

According to some embodiments of the present disclosure, the enclosure includes at least two or more first enclosures extended along a first side of the display panel and disposed in parallel with a first direction.

According to some embodiments of the present disclosure, the enclosure includes at least two or more second enclosures extended along a second side of the display panel and disposed in parallel with a second direction.

According to some embodiments of the present disclosure, the first enclosure includes at least six enclosures disposed in an area adjacent to the second sound generating module.

According to some embodiments of the present disclosure, the first enclosure includes an enclosure extension extended in a second direction vertical to the first direction, and the enclosure extension includes at least four extensions.

According to some embodiments of the present disclosure, the first area and the second area are a left area and a right area of the display panel, respectively, and the third area is a center area of the display panel, which is not overlapped with the first area and the second area.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display apparatus, comprising:
   a display panel including a first area, a second area and a third area;
   a first rear cover disposed on a rear surface of the display panel;
   a second rear cover covering at least a portion of the first rear cover;
   a first partition disposed between the rear surface of the display panel and the first rear cover to partition the first area, the second area and the third area from one another;
   a first sound generating module disposed in the first area and the second area to contact the rear surface of the display panel;
   a second sound generating module disposed in the third area to be spaced apart from the rear surface of the display panel; and
   a port hole provided in the third area by removing a portion of the first rear cover to allow the second sound generating module to face the rear surface of the display panel.

2. The display apparatus of claim 1, further comprising an enclosure disposed between the rear surface of the display panel and the first rear cover and disposed in the third area so as not to overlap the second sound generating module.

3. The display apparatus of claim 1, wherein the first sound generating module generates a sound in the first and second areas by directly vibrating the rear surface of the display panel, and the second sound generating module generates a sound in the third area by vibrating a resonant space formed through the port hole between the rear surface of the display panel and the second sound generating module.

4. The display apparatus of claim 1, further comprising a second partition extending from the second rear cover to correspond to the first partition to form areas corresponding to the first area, the second area, and the third area between the first rear cover and the second rear cover, and
wherein the second rear cover includes a first sound hole and a second sound hole.

5. The display apparatus of claim 2, wherein the enclosure includes at least two or more first enclosures extended along a first side of the display panel and disposed in parallel with a first direction.

6. The display apparatus of claim 5, wherein the enclosure includes at least two or more second enclosures extended along a second side of the display panel and disposed in parallel with a second direction.

7. The display apparatus of claim 5, wherein the first enclosure includes at least six enclosures disposed in an area adjacent to the second sound generating module.

8. The display apparatus of claim 7, wherein the first enclosure includes an enclosure extension extended in a second direction vertical to the first direction, and the enclosure extension includes at least four extensions.

9. The display apparatus of claim 1, wherein the first area and the second area are a left area and a right area of the display panel, respectively, and the third area is a center area of the display panel.

10. A display apparatus, comprising:
a display panel including a first area, a second area and a third area;
a first rear cover disposed on a rear surface of the display panel;
a second rear cover covering at least a portion of the first rear cover;
a first sound generating module disposed between the display panel and the second rear cover and disposed in the first area and the second area;
a second sound generating module disposed between the display panel and the second rear cover and disposed in the third area;
a first partition partitioning the first area, the second area and the third area from one another;
a port hole provided in an area where the first rear cover and the second sound generating module are overlapped with each other; and
a first sound hole provided in an area where the second rear cover and the second sound generating module are overlapped with each other by removing at least a portion of the second rear cover.

11. The display apparatus of claim 10, wherein the port hole is provided by removing a portion of the first rear cover.

12. The display apparatus of claim 10, further comprising:
a second partition disposed between the first rear cover and the second rear cover and extended from the second rear cover to partition the first area, the second area and the third area from one another; and
a second sound hole provided in the second rear cover.

13. The display apparatus of claim 10, further comprising an enclosure disposed between the rear surface of the display panel corresponding to the third area and the first rear cover, wherein the enclosure is disposed so as not to overlap the second sound generating module.

14. The display apparatus of claim 13, wherein the enclosure includes at least two or more first enclosures extended along a first side of the display panel and disposed in parallel with a first direction.

15. The display apparatus of claim 14, wherein the enclosure includes at least two or more second enclosures extended along a second side of the display panel and disposed in parallel with a second direction.

16. The display apparatus of claim 14, wherein the first enclosure includes at least six enclosures disposed in an area adjacent to the second sound generating module.

17. The display apparatus of claim 16, wherein the first enclosure includes an enclosure extension extended in a second direction vertical to the first direction, and the enclosure extension includes at least four extensions.

18. The display apparatus of claim 10, wherein the first area and the second area are a left area and a right area of the display panel, respectively, and the third area is a center area of the display panel.

19. The display apparatus of claim 10, further comprising a heat diffusion pad between the first sound generating module and the second rear cover.

* * * * *